(12) United States Patent
Phan et al.

(10) Patent No.: US 11,060,549 B2
(45) Date of Patent: Jul. 13, 2021

(54) CAPTIVE FASTENER

(71) Applicant: Fastener Technology Corp., North Hollywood, CA (US)

(72) Inventors: Benjamin Phan, Arcadia, CA (US); Simon Ly, Rosemead, CA (US); William Smyrski, Granada Hills, CA (US); An Tran, Rosemead, CA (US); Patrick Tran, Arcadia, CA (US); Yuriy Bern, No. Hollywood, CA (US); Larisa Zilber, Northridge, CA (US)

(73) Assignee: FASTENER TECHNOLOGY CORPORATION, North Hollywood, CA (US)

( * ) Notice: Subject to any disclaimer, the term of this patent is extended or adjusted under 35 U.S.C. 154(b) by 225 days.

(21) Appl. No.: 16/274,923

(22) Filed: Feb. 13, 2019

(65) Prior Publication Data
US 2019/0257347 A1 Aug. 22, 2019

Related U.S. Application Data

(60) Provisional application No. 62/632,490, filed on Feb. 20, 2018.

(51) Int. Cl.
*F16B 39/04* (2006.01)
*F16B 41/00* (2006.01)
(52) U.S. Cl.
CPC ............ *F16B 39/04* (2013.01); *F16B 41/002* (2013.01)

(58) Field of Classification Search
CPC ...... F16B 39/04; F16B 41/002; F16B 21/165; F16B 21/086; A45C 13/262; A45C 2013/267
See application file for complete search history.

(56) References Cited

U.S. PATENT DOCUMENTS

| | | | | |
|---|---|---|---|---|
| 2,426,099 A | * | 8/1947 | Hershowitz | B60D 1/04 280/504 |
| 2,762,639 A | * | 9/1956 | Molter | A47F 5/14 403/164 |
| 3,712,356 A | * | 1/1973 | Petroshanoff | F16B 39/04 411/208 |
| 3,742,807 A | * | 7/1973 | Manning | F16B 21/086 269/48.2 |
| 4,026,605 A | * | 5/1977 | Emmerich | E21C 35/19 299/107 |
| 4,759,671 A | * | 7/1988 | Duran | F16B 21/086 411/347 |

(Continued)

*Primary Examiner* — Flemming Saether
(74) *Attorney, Agent, or Firm* — Fulwider Patton LLP

(57) ABSTRACT

A captive fastener comprising a head, a neck, and a threaded shaft, and one or more spring loaded pins disposed within respective cavities of the shaft along at least first and second radial directions. Each spring loaded pin is located in a chamber of the shaft with an annular rim on at a proximal end of the pin that prevents the pin completely passing through an aperture and out the chamber. The distal end of the pin projects through the aperture and out of the shaft when the spring is not compressed. That is, the spring biases the pin outward such that a distal portion of the pin projects through the hole, but the spring can collapse to allow the fastener to pass through a fitted opening sized to receive the shaft of the fastener before the pin expands outward.

2 Claims, 3 Drawing Sheets

(56) References Cited

U.S. PATENT DOCUMENTS

| | | | | |
|---|---|---|---|---|
| 4,772,448 | A * | 9/1988 | Popalis | G21C 7/00 376/463 |
| 5,480,108 | A * | 1/1996 | Amiand | B64F 1/125 244/115 |
| 5,802,795 | A * | 9/1998 | Myers | E04G 17/045 249/196 |
| 6,827,186 | B1 * | 12/2004 | Hsie | A45C 13/262 16/113.1 |
| 8,641,344 | B1 * | 2/2014 | Avetisian | F16B 39/32 411/347 |
| 9,255,501 | B2 * | 2/2016 | Esposito | F01M 11/0408 |
| 9,784,295 | B2 * | 10/2017 | Blanchard | A01B 1/22 |
| 2011/0033262 | A1 * | 2/2011 | Gulistan | F16B 5/0208 411/347 |

\* cited by examiner

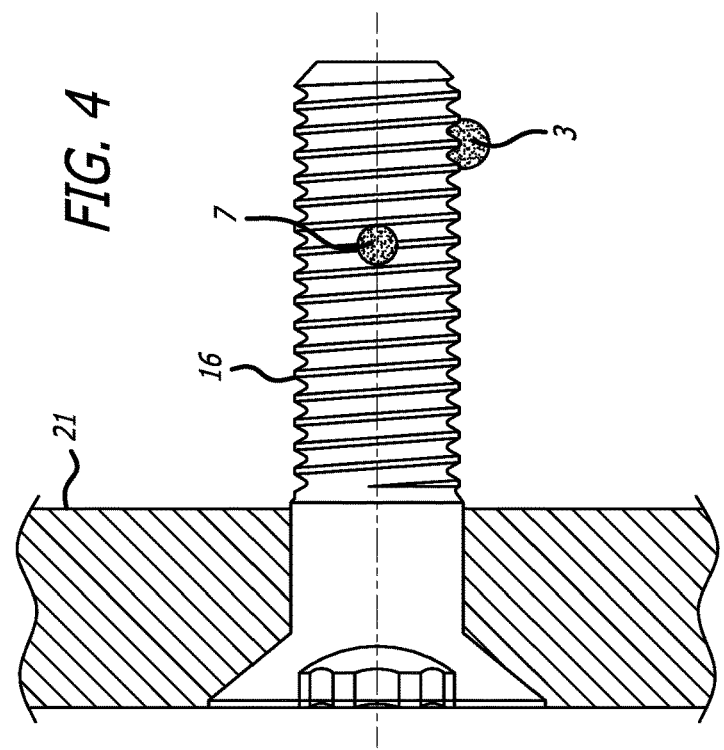
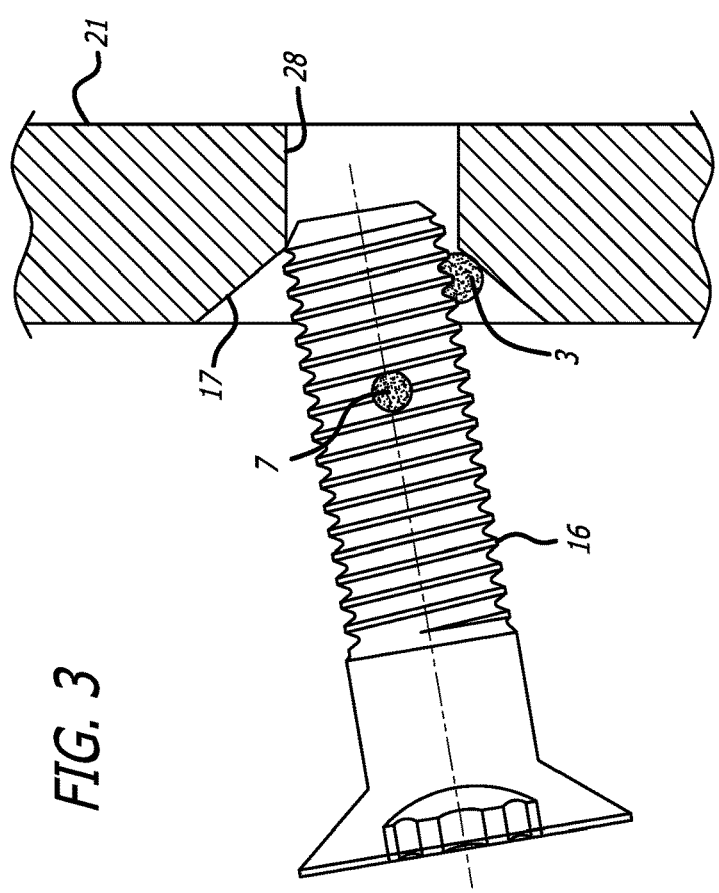

CAPTIVE FASTENER

CROSS-REFERENCES TO RELATED APPLICATIONS

This application claims priority from U.S. Application No. 62/632,490, filed Feb. 20, 2018 incorporated by reference in its entirety.

BACKGROUND

The present invention relates generally to fasteners, and more particularly to a fastener with a pair of spring loaded pins that withdraw into the shaft of the fastener during insertion and expand or project outward from the shaft at different axial positions through respective apertures post-insertion for preventing the fastener from being retracted through the aperture.

It is known in the art to design fasteners such that, once inserted into an opening of a panel, the shaft of the fastener expands to prevent the fastener from withdrawing through the opening. The shaft can expand in different ways, like an umbrella, a tri-pod, etc., such that projections that extend from the shaft make contact with the opposite side of the panel, sheet, nut, or other object receiving the fastener. Examples of such fasteners are offered by Fastener Technology Corporation, Inc., of North Hollywood, Calif., the assignee of the present invention. These fasteners often require a special installation tool, as well as additional external parts (e.g., retainer ring, etc.) The present invention is a novel design for improving a fastener capture technique in a low cost, reliable manner that does not require the extraneous tools and components of the previous fasteners.

SUMMARY OF THE INVENTION

The present invention is a captive fastener comprising a head, a neck, and a threaded shaft, and one or more spring loaded pins disposed within respective cavities of the shaft along at least first and second axial positions. Each spring loaded pin is located in a chamber of the shaft with an annular rim on at a proximal end of the pin that prevents the pin completely passing through an aperture and out the chamber. The distal end of the pin projects through the aperture and out of the shaft when the spring is not compressed. That is, the spring biases the pin outward such that a distal portion of the pin projects through the hole, but the spring can collapse to allow the fastener to pass through a fitted opening sized to receive the shaft of the fastener before the pin expands outward. In one embodiment, a pair of pins, each perpendicular to each other and to the longitudinal axis of the shaft of the fastener, can be used to both hold the fastener in an upright position and prevent the fastener from being withdrawn through the hole.

After passing through the panel, nut, or other object, the compressive force on the end of the pins will be released, causing the springs to expand the pins outwardly until the pins project out of the shaft of the fastener. The annular rim on each pin prevents the pin from completely passing through the hole, so that the pin ends project outwardly from the shaft. In a preferred embodiment, there is a captive pin and a hold out pin, the captive pin being closer to the end of the fastener shaft and the hold out pin closer to the head of the fastener. Once inserted into a board, sheet, or the like, the captive pin expands and prevents the fastener from being drawn back through the same aperture. The hold out pin can be used to align the fastener in the board, sheet, etc.

Moreover, the captive pin bears against any perpendicular surface if the fastener is attempted to be withdrawn, and provides a more secure bearing force compared with other captive fasteners.

These and other features of the present invention will best be understood by reference to the detailed description of the invention below, along with the accompanying figures set forth below.

BRIEF DESCRIPTION OF THE DRAWINGS

FIG. 3 is a side view of the fastener of FIG. 1 entering a panel;

FIG. 4 is a side view of the fastener of FIG. 1 having passed through the panel to expose the hold out pin and captive pin;

DETAILED DESCRIPTION OF THE PREFERRED EMBODIMENTS

Figure 1:
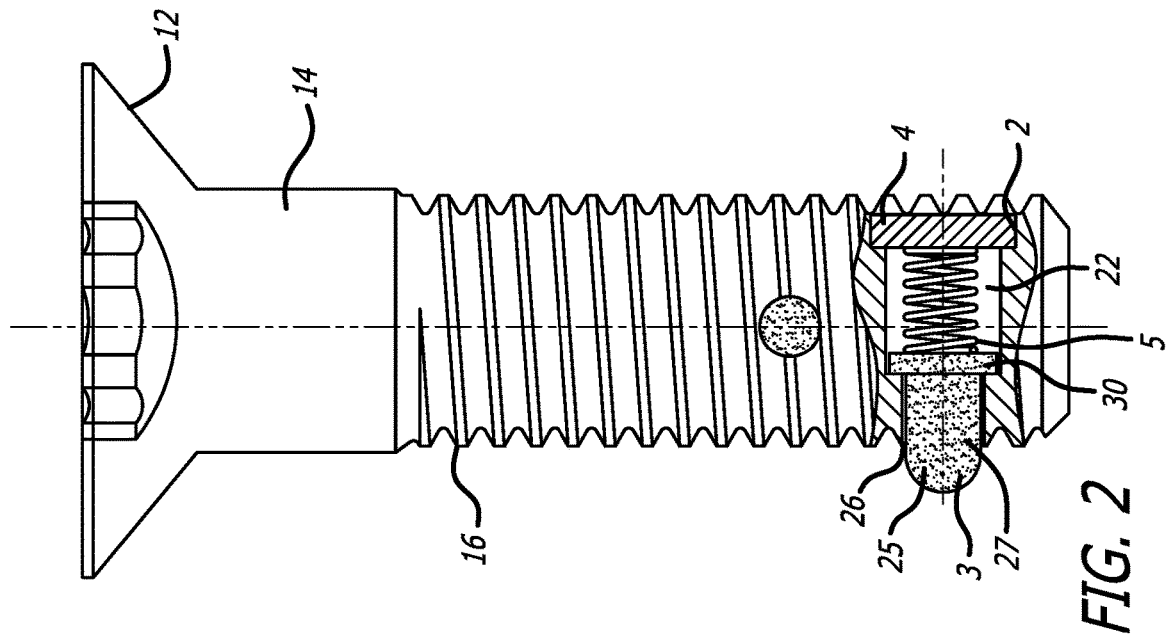
FIG. 1 is a front view, partially cut-away, of the present invention, showing the hold out pin 7.
Figure 2:
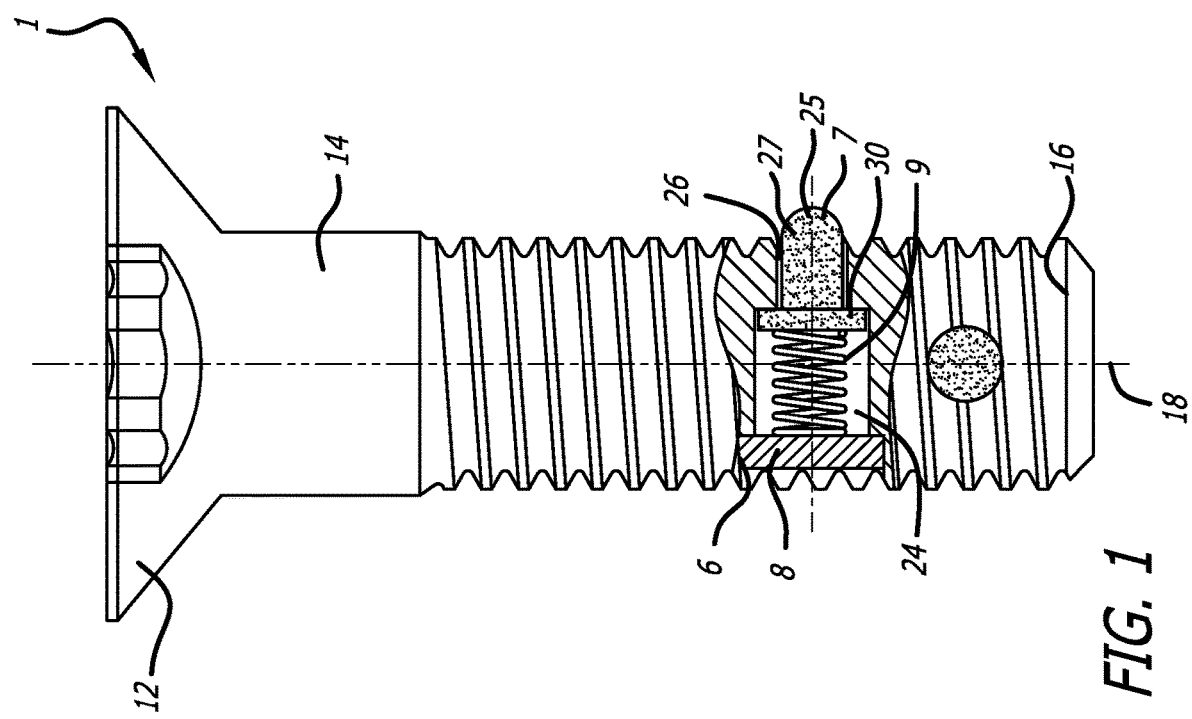
FIG. 2 is a side view, partially cut-away, of the embodiment of FIG. 1, showing the captive pin 3.

FIGS. 1 and 2 show a fastener of a first embodiment of the present invention, where the fastener 1 is a flush head screw having a head 12, a neck 14, and a threaded shaft 16 having a longitudinal axis 18. The head may have 6-lobes recess at an upper surface, or a Phillips or screwdriver slot as required, or no slot in the case of bolts. The shaft 16 may have any pitch thread, and the neck may have any length as needed. In the example shown, the head 12 is countersunk to match a recess 17 in a panel 21 so that the head 12 will be flush against the panel 21 at the recess when the fastener 1 is fully driven into the panel 21, although the invention is not so limited and other types of fastener heads and panel recesses are within the scope of the invention.

The shaft 16 of the fastener 1 is formed with first and second internal cavities 22, 24 spaced axially along the shaft's length. At each cavity is a circular opening 26 that has a smaller diameter than the diameter of the cavity 22, 24, and each circular opening 26 provides an outlet to its respective cavity. Opposite each circular opening 26 is a counter bore 2, 6 that is fitted with a plug 4, 8 that provides a support for the spring action of the pins.

With further reference to FIGS. 1 and 2, the internal cavities 22, 24 each include an expandable pin 3,7 formed by a spring 5,9 and a cylindrical pin body 27 with a spherical distal end 25 and an annular proximal rim 30. It is to be understood that the particular shapes are not critical to the invention, and that the invention is not limited to these shapes. The radius of the cylindrical body 27 is sized to match the inner radius of the circular opening 26 so as to slide into and out of the opening freely. The outward movements of the pins 3,7 are arrested by the contact of the annular rim 30 against the circular opening 26, such that the pins can only extend out of the shaft 16 a limited distance. This condition leaves the ends 25 of the pins 3, 7 extending outwardly from the shaft 16 a small amount that exceeds the diameter of the shaft.

The pins 3, 7 are each biased to extend through the circular openings 26 by respective springs 5, 9 that bear against the plugs 4,8 and are aligned so that the axes of the coil springs are aligned with the longitudinal axis of the respective circular opening 26. As shown in FIGS. 1 and 2, the springs 5, 9 bias the pins outward, but also permit the pins to be collapsed or retracted into the respective cavity against the biasing of the springs 5, 9. Once a compressive force is removed, the springs 5, 9 extend the pins 3, 7 until the annular rim 30 of the pin bear against the inner wall of the cavity at the circular opening 26. The captive pin 3 and the hold out pin 7 thus collapse to a position within the fastener shaft 16 when a compressive force is applied, and spring apart to a deployed position when the compressive force is removed.

Figure 6:
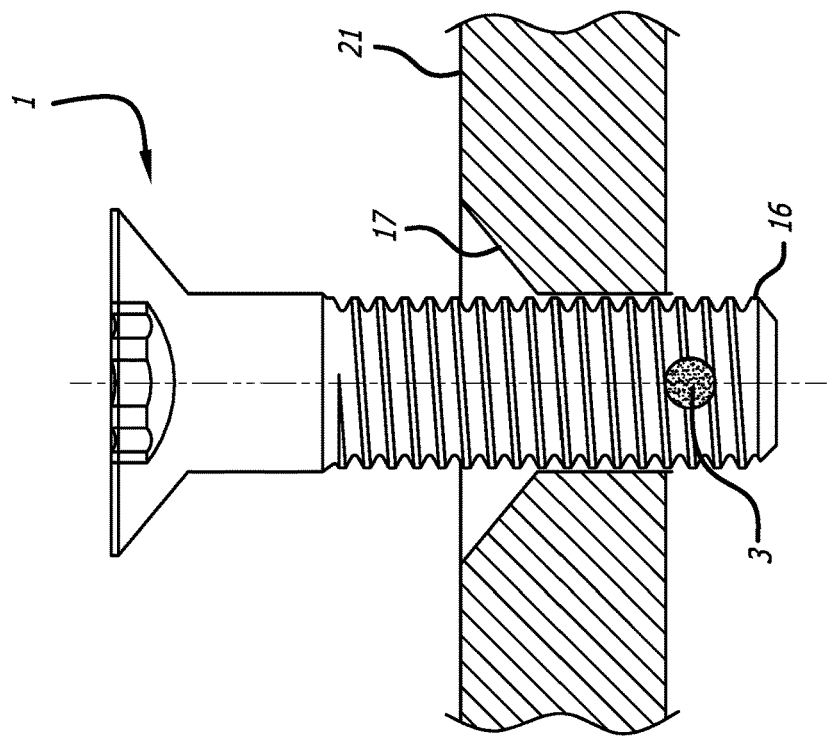
FIG. 6 is a front view of the fastener of FIG. 1, showing the fastener in upright position, being held out by pin 7.
Figure 5:
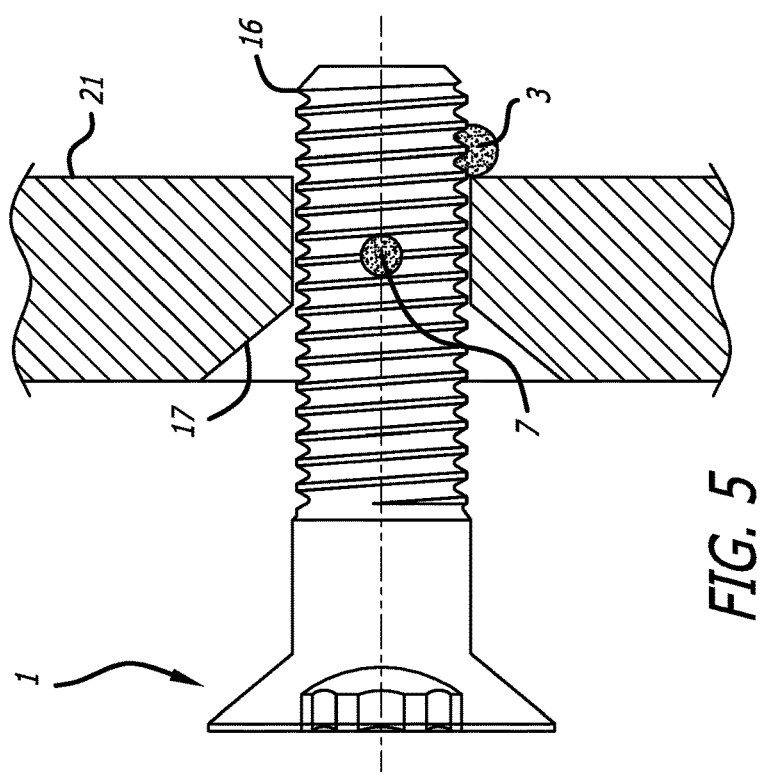
FIG. 5 is a side view of the fastener of FIG. 1 where the captive pin locks the fastener in the panel and the hold out pin is retained by the panel.

Turning to FIGS. 3-6, when the fastener 1 is inserted into the countersunk hole 17 of the panel 21, a tilting of the fastener (FIG. 3) will depress the captive pin 3 to force the captive pin 3 into its chamber 22 and allow the fastener to enter the panel 21. The force of the panel collapses the pin 3 against the bias of the spring 5, allowing the fastener to pass through the straight portion 28 of the countersunk hole 17. The fastener 1 is fully inserted into the panel 21 (FIG. 4), until the shaft 16 of the fastener reemerges from the hole 28. Once the shaft 16 of the fastener passes through the panel 21 and the circular openings 26 are clear of the panel 21, the pins 3, 7 have no compressive force to counteract the expanding force of the springs 5, 9 and the pins expands outward until they reach their maximum extension. In their expanded state, as seen in FIG. 4, the pins' protrusion from the shaft 16 exceeds the diameter of the hole 28. If the hold out pin 7 is depressed again during the withdrawal of the fastener 1, the captive pin 3 prevents the pin from separating from the panel 21 while the hold out pin 7 creates a hold out feature to position the fastener 1 in a perpendicular orientation with respect to the panel 21, as shown in FIGS. 5 and 6.

While the preferred embodiments of the present invention have been depicted and described, the invention is not limited to the foregoing descriptions and depictions. Rather, one of ordinary skill in the art will readily recognize and appreciate that modifications and substitutions would be possible in connection with the foregoing preferred embodiment, and the scope of the invention is intended to cover all such substitutions and modifications.

The invention claimed is:

1. A flush head screw with captivating pins, comprising:
a fastener having a head, a neck, and a shaft;
a first cavity in the shaft having a first opening to the shaft and a first counter bore opposite the first opening of a larger diameter than a diameter of the first opening, the counterbore closed by a first plug;
a hold out pin disposed in the first cavity having a first annular rim at a first end with a diameter larger than a diameter of the first opening, the hold out pin including a first spring between the hold out pin and the first plug, the first spring biasing the hold out pin through the first opening;
a second cavity in the shaft having a second opening to the shaft and a second counter bore opposite the second opening of a larger diameter than a diameter of the second opening, the second counterbore closed by a second plug; and
a captive pin disposed in the second cavity having an annular rim at a first end with a diameter larger than a diameter of the second opening, the captive pin including a second spring between the captive pin and the second plug, the second spring biasing the captive pin through the second opening;
wherein the hold out pin and the captive pin are spaced apart at first and second axial positions along the shaft; and
wherein a projection of an axis of the captive pin and a projection of an axis of the hold out pin onto a plane normal to an axis of the shaft form an angle less than 180 degrees to each other.

2. The flush head screw of claim 1, wherein the acute angles are right angles.

* * * * *